United States Patent
Allen et al.

(10) Patent No.: US 8,276,122 B2
(45) Date of Patent: Sep. 25, 2012

(54) METHOD TO SPEED UP CREATION OF JUNIT TEST CASES

(75) Inventors: Corville O. Allen, Morrisville, NC (US); Albert Alexander Chung, Cary, NC (US); Binh Truong, Cary, NC (US); Kam Kan Yee, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 12/237,068

(22) Filed: Sep. 24, 2008

(65) Prior Publication Data
US 2010/0077381 A1 Mar. 25, 2010

(51) Int. Cl.
*G06F 9/44* (2006.01)
*G06F 9/00* (2006.01)

(52) U.S. Cl. ........................ 717/124; 712/152

(58) Field of Classification Search .......... 712/124–133, 712/151–152
See application file for complete search history.

(56) References Cited

U.S. PATENT DOCUMENTS

| | | | |
|---|---|---|---|
| 7,296,188 B2 | 11/2007 | Paternostro et al. | |
| 7,865,779 B2* | 1/2011 | Tsang | 714/38.1 |
| 7,913,230 B2* | 3/2011 | Vikutan | 717/124 |
| 7,979,849 B2* | 7/2011 | Feldstein et al. | 717/128 |
| 8,141,047 B2* | 3/2012 | Akeel et al. | 717/125 |
| 2004/0133880 A1* | 7/2004 | Paternostro et al. | 717/124 |
| 2005/0144593 A1* | 6/2005 | Raghuvir et al. | 717/124 |
| 2006/0184928 A1* | 8/2006 | Hughes | 717/168 |
| 2006/0230320 A1* | 10/2006 | Salvador et al. | 714/38 |
| 2006/0248405 A1 | 11/2006 | Ponczak et al. | |
| 2007/0240127 A1* | 10/2007 | Roques et al. | 717/136 |
| 2008/0098360 A1* | 4/2008 | Klinger et al. | 717/128 |
| 2008/0127093 A1* | 5/2008 | Fernandez-Ivern et al. | 717/124 |
| 2008/0127101 A1* | 5/2008 | Anafi et al. | 717/125 |
| 2008/0184206 A1* | 7/2008 | Vikutan | 717/127 |
| 2009/0055686 A1* | 2/2009 | Tsang | 714/33 |
| 2009/0178029 A1* | 7/2009 | Akeel et al. | 717/125 |

* cited by examiner

*Primary Examiner* — Christopher B Shin
(74) *Attorney, Agent, or Firm* — Cahn & Samuels, LLP

(57) ABSTRACT

A system and method for quickly and efficiently developing JUnit test cases by enabling automated creation of test environment objects that are needed by the JUnit test cases. The system and method maps and captures program code execution paths or "blueprints" such that the blueprints can be utilized to automatically "drive" the program along an execution path to any point in the program. These points can then be used to "harvest" the environment objects needed for JUnit test cases.

1 Claim, 1 Drawing Sheet

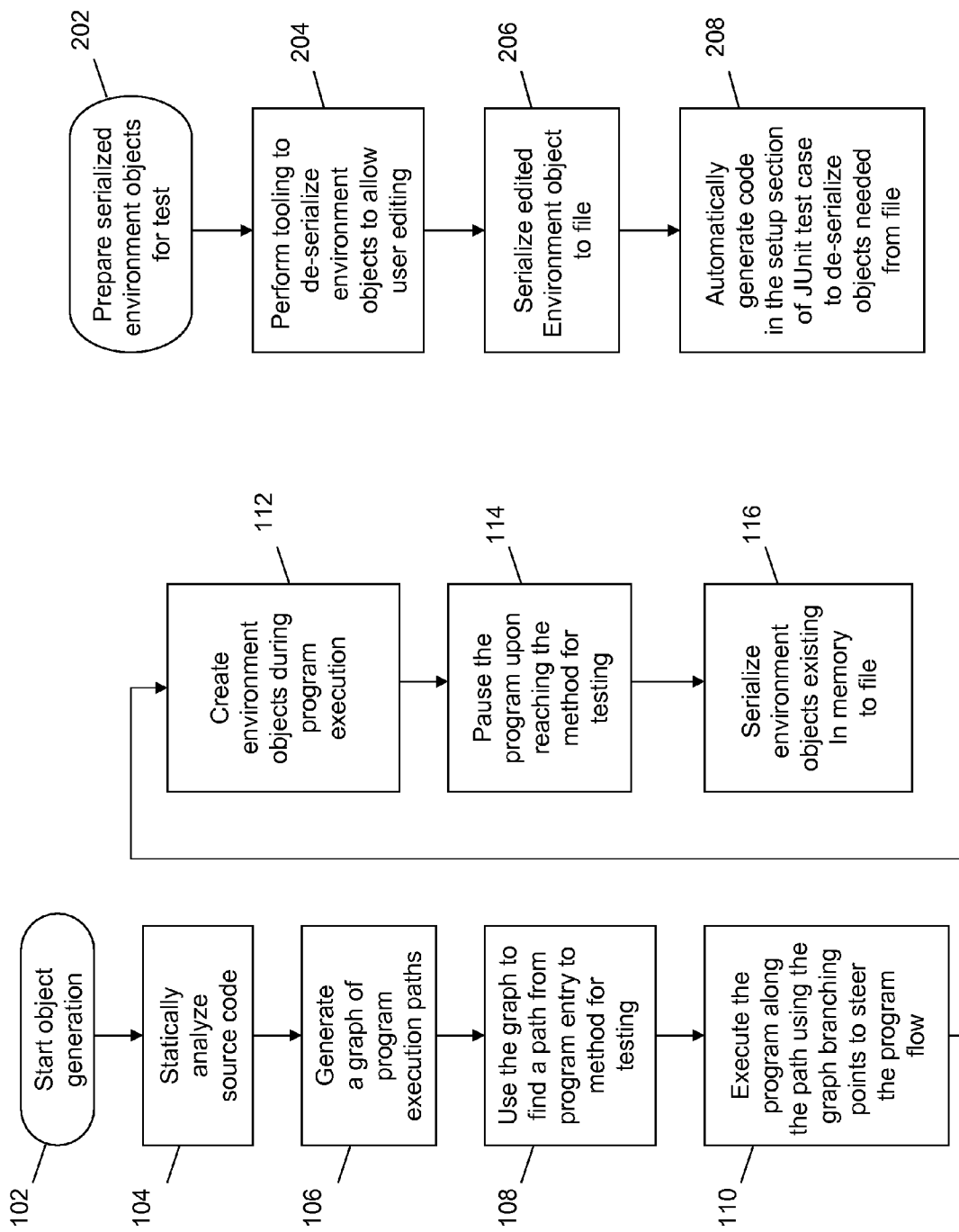

METHOD TO SPEED UP CREATION OF JUNIT TEST CASES

I. FIELD OF THE INVENTION

This invention relates to a system and method for quickly and efficiently developing JUnit test cases by enabling the automated creation of test environment objects needed by the JUnit test cases. Specifically, the invention relates to a system and method that maps and captures program code execution paths or "blueprints" that can be utilized to automatically "drive" the program along an execution path to any point in the program such that the environment objects needed for JUnit test cases can be "harvested".

II. BACKGROUND OF THE INVENTION

Software developers must ensure that the software, i.e., the written software code, functions properly. In order to ensure proper code function, the written software code must pass known parameters and not "break" code, i.e., the written code must produce expected results. Test cases are a tool used by software developers to help ensure that software code functions as expected.

Test cases are written for methods or functions in the software code. These test cases are typically written as the software code is written. When writing test cases the test cases may require test environment objects. These objects can be used directly by the test cases of passed in as parameters.

JUnit is an open source test framework that allows developer to write and run repeatable tests on software. One major issue in writing JUnit test cases for complex software is the time required to write code to setup the test environment. JUnit test cases often require the creation of complex objects arguments to pass to the method under test or the creation of complex objects in the setup method so that the objects can be used by the method under test. The code to create these environmental objects can sometimes be longer than the implementation of the method being tested. In addition, if these environmental objects involve third party objects their creation may be even more difficult or unknown.

The current solution to this problem is to create mock objects. Mock objects provide a simulated implementation of the real objects needed for JUnit testing. In this process mock objects are used instead of passing real objects to the test methods. While mock objects can be effective for many test cases they also require considerable time to write. In some cases, the source code under test must be modified to accommodate the mock objects during test. Furthermore, the number of lines of code required to be written for mock objects may still exceed the number of lines of code being tested.

III. SUMMARY OF THE INVENTION

In at least one exemplary embodiment the present invention provides an apparatus that statically analyzes a software program source code; generates a graph of the program execution paths based on the static analysis of the source code; utilizes the graph to find at least one execution path for a method for testing in the source code; executes the program along the at least one execution path; creates environmental objects during program execution; pauses the program after reaching the method for testing; serializes the environmental objects to file; de-serializes the environmental objects; edits the state of the environmental objects; serializes the edited environmental objects to file; and utilizes the serialized environmental objects to automatically generate code in the setup section of JUnit test cases.

In at least one exemplary embodiment the present invention provides a method for statically analyzing a software program source code; generating a graph of the program execution paths based on the static analysis of the source code; utilizing the graph to find at least one execution path for a method for testing in the source code; executing the program along the at least one execution path; creating environmental objects during program execution; pausing the program after reaching the method for testing; serializing the environmental objects to file; de-serializing the environmental objects; editing the state of the environmental objects; serializing the edited environmental objects to file; and automatically generating code in the setup section of JUnit test cases.

IV. BRIEF DESCRIPTION OF THE DRAWINGS

The present invention is described with reference to the accompanying drawings, wherein:

FIG. 1 illustrates an example of the method of creating JUnit test objects of the present invention.

FIG. 2 illustrates an example of the method of creating JUnit test cases utilizing stored test objects of the present invention.

Given the following enabling description of the drawings, the apparatus should become evident to a person of ordinary skill in the art.

V. DETAILED DESCRIPTION OF THE DRAWINGS

The present invention, in at least one embodiment, discloses a system and method for analyzing and mapping software program source code. The mapping reveals program execution paths of the software program from entry point of the program to any method in the source. The mapping thereby creates a "blueprint" of the multiple execution paths available for the method of interest. This blueprint can then be used to automatically run/steer the program execution from the program entry point to the method required for JUnit testing. Upon reaching the destination method, the system pauses, takes a snapshot of the environment, and stores the captured objects for later use. The system also allows users to edit the objects using a user interface. This system and method allows subsequent software developers writing JUnit cases to simply load the captured objects for the test cases thereby saving significant time and effort developing the JUnit test cases.

FIG. 1 illustrates an example of the method of creating JUnit test objects of the present invention. At 102, the method begins generating test objects. At 104, source code is statically analyzed. At 106, a graph of program execution paths is generated. At 108, the graph is used to find a path from program entry to method for testing. At 110, the program is executed along this path. The graph is used to steer the program flow at program branching points. At 112, environment objects are created along the way during program execution. At 114, when it reaches the method for testing the program is paused. At 116, the environmental objects existing in memory are serialized to file for later use. The serialized environmental objects can then be used at any time to create subsequent JUnit test cases.

FIG. 2 illustrates an example of the method of creating JUnit test cases utilizing stored test objects of the present invention. At 202, the method begins by preparing serialized environment objects for test. At 204, tooling is performed to de-serialize environment objects to allow the object states to be edited. At 206, the edited objects are serialized to file for later use. At 208, the code in the setup section of the JUnit test case is automatically generated to de-serialize objects needed from file.

In order to perform the method of the present invention, the system performs static analysis of the source code. In one embodiment, the analysis may be performed, for example, using compiler and graph techniques. Static analysis is used to produce a mathematical definition of a graph having a discrete structure containing vertices (points) and edges (connecting lines). The vertices represent classes, methods and branching points. The edges represent program execution paths from vertex to vertex. The edges connect the vertices to form a graph with paths. The paths in the graph represent a model of all the possible program execution paths from any point in the program to any other point.

The system can employ a single source shortest path algorithm to find the program execution path or paths from the entry point to the method for testing. There are several known mathematical algorithms that can find all the paths that can be traveled from one vertex to another vertex. An example of an algorithm suitable for use with the present invention is Dijkstra's shortest path algorithm.

The example listed below illustrates an exemplary mapping of two simple Java software code classes produced by the static analysis of source code. The mapping includes node vertices (circled) connected by edges (connecting lines) that illustrate the shortest code execution paths.

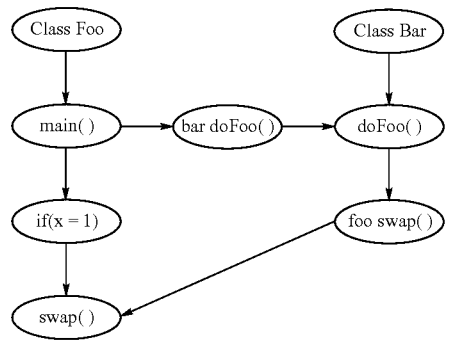

The exemplary graph listed above provides a graph of the program execution paths. All of the environmental objects included in the execution paths are identified and serially stored. The objects may also be presented to a user interface with a hierarchical structure representation of the serialized objects. A user, such as a software developer or tester, can then change the state of the objects by setting new values to the object fields. These objects can be used to quickly and efficiently develop JUnit test cases. This process thereby avoids the need to develop test objects when creating a JUnit test case.

The invention can take the form of an entirely hardware embodiment, an entirely software embodiment or an embodiment containing both hardware and software elements. In at least one exemplary embodiment, the invention is imple-

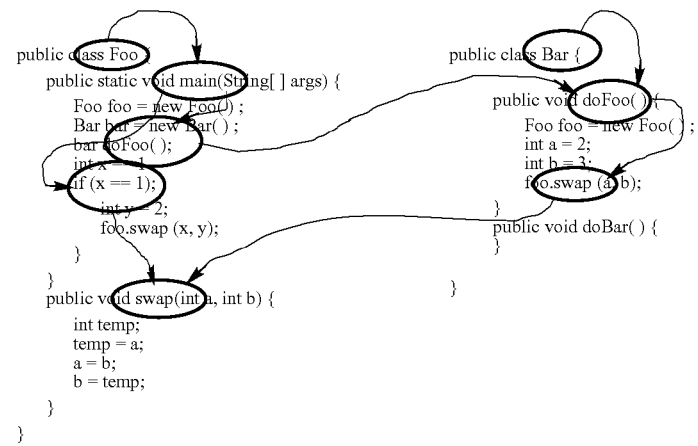

The mapping produced by the static analysis of the source code provides the system with a blueprint on how to run software automatically from the program entry point to the method for testing. Given that conditional branching points are vertices, the system can "steer" the program to run in one of the calculated paths to produce the method for testing.

At this point all the environmental objects needed by the method to run are present in the system memory. The system then commits the objects to file. The system then display a user interface to the user with hierarchical structure representation of the serialized objects. The user can then change the state of the objects by setting new values to the object fields.

The example listed below illustrates an exemplary graph of the mapping for the two simple Java software code classes in the example above.

mented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As will be appreciated by one of ordinary skill in the art, the present invention may be embodied as a computer implemented method, a programmed computer, a data processing system, a signal, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, carrier signals/waves, or other storage devices.

The exemplary embodiments described above may be combined in a variety of ways with each other. Furthermore, the steps and number of the various steps illustrated in the figures may be adjusted from that shown.

Although the present invention has been described in terms of particular exemplary embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary embodiments described above can be configured without departing from the scope and spirit of the invention. Therefore, it is to be understood that, within the scope of the appended claims, the invention may be practiced other than as specifically described herein.

We claim:

1. A method, comprising:
   statically analyzing a software program source code;
   generating a graph of the program execution paths based on the static analysis of the source code;
   utilizing the graph to find at least one execution path for a method for testing in the source code;
   executing the program along the at least one execution path;
   creating environmental objects during program execution;
   pausing the program after reaching the method for testing;
   serializing the environmental objects to file;
   de-serializing the environmental objects;
   editing the state of the environmental objects;
   serializing the edited environmental objects to file; and
   utilizing the serialized environmental objects to automatically generate code in the setup section of JUnit test cases.

* * * * *